No. 890,497.
PATENTED JUNE 9, 1908.
M. C. CLARK.
APPARATUS FOR REFINING RUBBER.
APPLICATION FILED MAR. 28, 1907.
2 SHEETS—SHEET 1.
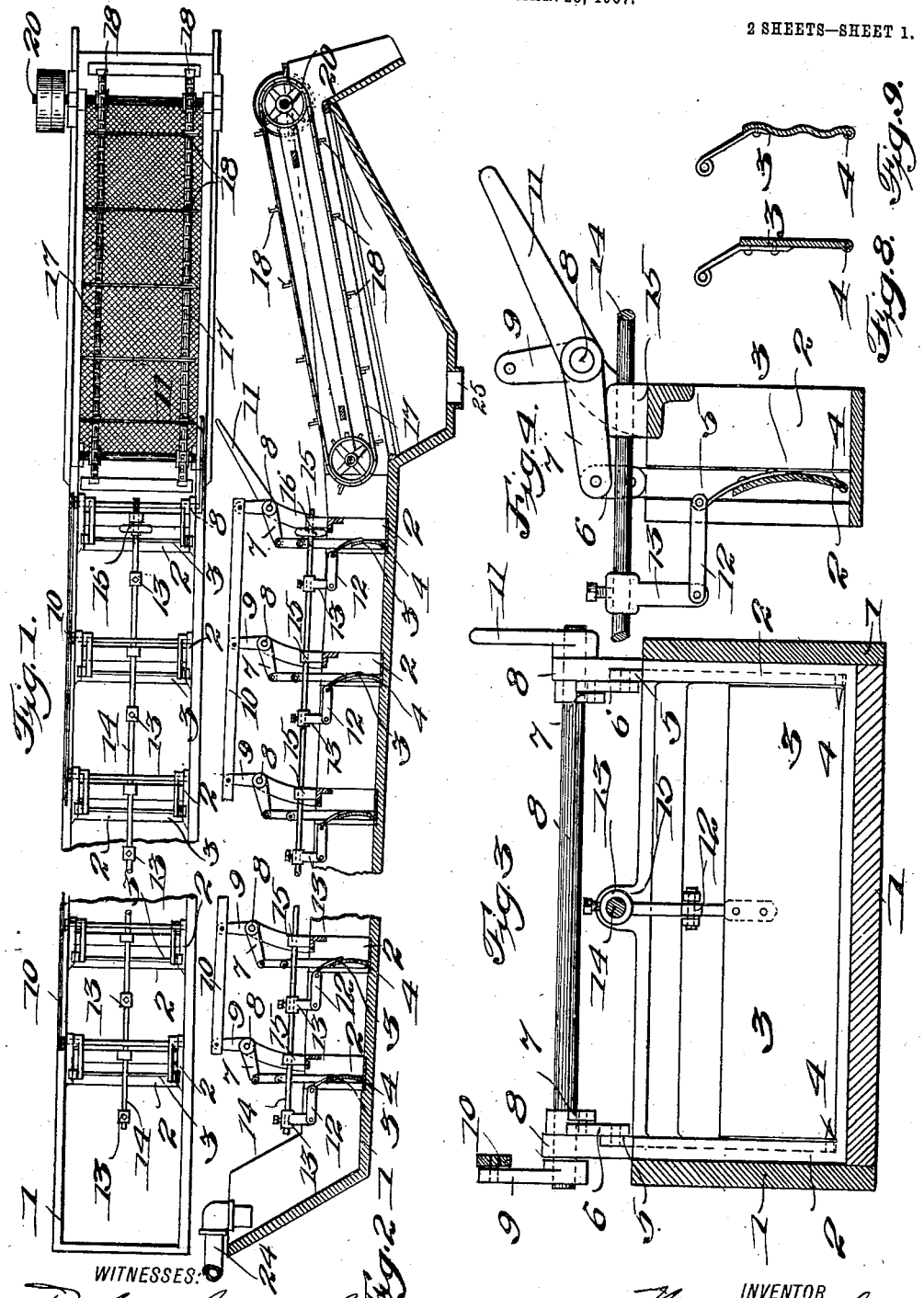
WITNESSES:
INVENTOR
Maurice C. Clark.
BY
ATTORNEYS No. 890,497. PATENTED JUNE 9, 1908.
M. C. CLARK.
APPARATUS FOR REFINING RUBBER.
APPLICATION FILED MAR. 28, 1907.
2 SHEETS—SHEET 2.
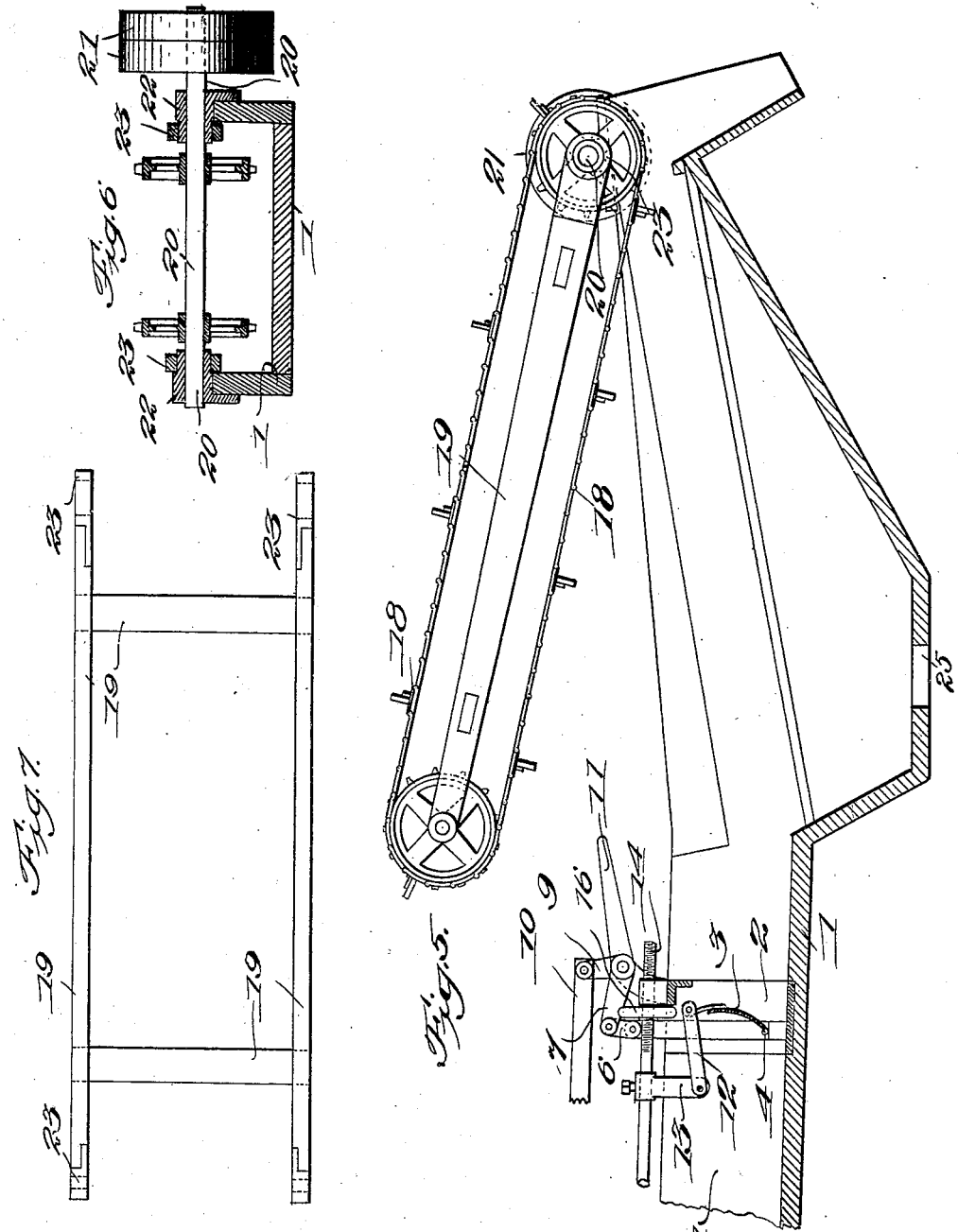

UNITED STATES PATENT OFFICE.

MAURICE C. CLARK, OF PROVIDENCE, RHODE ISLAND.

APPARATUS FOR REFINING RUBBER.

No. 890,497. Specification of Letters Patent. Patented June 9, 1908.

Application filed March 28, 1907. Serial No. 365,186.

*To all whom it may concern:*

Be it known that I, MAURICE C. CLARK, a citizen of the United States, and a resident of Providence, in the county of Providence and State of Rhode Island, have invented a new and useful Improvement in Apparatus for Refining Rubber, of which the following is a specification.

This invention relates to a mechanism for cleaning and refining rubber and will be found especially useful in the refining of old vulcanized scrap rubber, such as boots, shoes, hose, and the like, and separating the metal, sand and other matters therefrom preparatory to the process of devulcanization.

In the accompanying drawings I have shown by way of illustration one preferred embodiment of my invention, but I wish it to be understood that I do not limit myself to all the precise details of construction shown therein as there may be modification and variation without departing from the spirit of the invention or the scope of the claims.

In the accompanying drawings Figure 1 is a plan of my invention showing both ends of the machine with a portion broken therefrom; Fig. 2 is a longitudinal vertical sectional view showing both ends of the machine with a portion broken away adjacent to the center of the machine; Fig. 3 is a cross sectional view of the machine showing the gate with its connections; Fig. 4 is a sectional elevation showing a curved gate in its frame with the adjusting mechanism therefor; Fig. 5 is a longitudinal sectional elevation showing the delivery or discharge end of the machine and the conveyer raised out of operative position, and the gate in the trough raised so as to allow the flushing of refuse from the bottom thereof, the screen also being removed; Fig. 6 is a view in cross section through the driving shaft of the conveyer; Fig. 7 is a detail view showing the conveyer carrying frame; Figs. 8 and 9 show a modified form of gates.

Referring now to the accompanying drawings in detail, 1 indicates a trough or tank constructed to hold the water or other fluid used in my process, such trough also forming a support to which are attached the frames 2, preferably formed of metal. Within the trough I arrange a series of curved gates 3 having trunnion bearings 4, 4 adjustably connected with the frames 2 by means of the vertically sliding bearings, 5, 5. These bearings 5, 5 are, by means of links 6, 6 connected with the lever 7, 7 which latter are preferably positively attached to the shafts 8. These shafts are journaled in bearings which form a part of the metal frame 2, and have on one end a lever 9 attached to the bar 10. On an end of one of the shafts 8, preferably that shaft on the gate mechanism nearest to the discharge end of the machine, I preferably positively attach a handle or lever 11 and the gates are in turn connected by links 12 to the brackets 13. These latter brackets are preferably adjustably attached to the rod 14, which rod in turn is adjustably connected to the frames 2 at the bearing points 15, and such rod is also adjustable endwise by means of threaded hand wheels 16.

Near one end of the trough I provide a perforated screen 17 above which is mounted a conveyer 18 preferably in the form of a drag conveyer, which is carried by the frame 19. The driving shaft of the conveyer is shown at 20, while 21 indicates the driving pulleys for the shaft and 22 the bearings thereof.

23 are bearings for the frame 19 and 24 is a pipe for supplying water to the trough.

The above is a brief description of the structural features of my apparatus and I will now proceed to describe the use and operation of the same.

Supposing the gates 3 to be in the position shown in Fig. 2, water is turned into the trough through the pipe 24, and the several compartments formed by the gate 3 are filled so that the water flows over the top edge of the gates, discharging eventually through the screen 17 and through the opening 25 in the bottom of the tank beneath the conveyer. The stock to be treated and which has been cracked up and boiled in acids to remove pieces of fabric and the like, and washed to remove the acid is fed into the head end of the machine near the water pipe 24, in a regular supply by any suitable means such as a conveyer or elevator. The stock carried by the water flows or passes over the top edge of the adjustable gates, through the intermediate compartments and is delivered by gravity to the screen 17, where it is taken by the drag conveyer 18 and discharged into a devulcanizing car or other receptacle. While the refined material is passing over the top edge of the gates and to the screen 17 the refuse product, such as sand, gravel, particles of metal substances and other foreign matter, will settle by gravity into the bottom of the compartments formed by the gates 3.

The gates 3 may be set at any angle from vertical to horizontal, by means of the threaded hand wheel on the end of the rod 14, which bears against the part 15 on the frame 2. By turning this hand wheel the rod 14 may move forward toward the opposite end of the machine, carrying in that direction the brackets 13 which are connected to the top gates 3 by means of the links 12, thus tilting the top edge of the gates to any desired angle, while the bottom edge remains in its original position held by the pivots or trunnions 4, 4 in the vertical sliding bearings 5, 5. The gates 3 can also be set at any angle in relation to each other by means of the brackets 13 which are slidably connected to the rod 14 and are held in place by the set screws as shown.

While for many purposes I prefer to use the curved adjustable gates, I may make use of gates of other form, either straight, as shown in Fig. 8, or corrugated or fluted, as shown in Fig. 9.

When refining a poorer grade of stock it is only necessary to operate the thread hand wheel 16 in order to incline the gates 3 to any angle desired, and the more angle given the gates the greater the amount of product will be, but such increased product will not be as thoroughly refined as when the gates are set vertically.

When a batch of stock has been run through my refining machine and it is desired to remove the refuse material which has collected in the bottom of the compartments formed by the gates 3, the frame 19 carrying the drag conveyer 18 is raised up from the screen 17 and the latter removed, as is shown in Fig. 5. The lever 11 is then pressed down, which, by means of the levers 9 and the bar 10 operating with the lever 7 through the shafts 8 and the links 6 connected to the vertical sliding bearings 5, raises all of the gates simultaneously up from the bottom of the machine and allows the waste material in the trough to be carried by the flow of water and discharged through the opening 25.

By the arrangement of the frame carrying the drag conveyer the latter may be raised out of the way expeditiously and the screen 17 quickly removed in order to clean out refuse from the bottom of the machine when necessary.

Having thus described my invention, what I claim as new and desire to secure by Letters Patent is:—

1. In an apparatus of the class described, a trough member, gates dividing said trough into compartments, and means for adjusting the angle of inclination of said gates.

2. In an apparatus of the class described, a trough member, gates dividing the same into compartments, means for adjusting the angle of inclination of said gates, and means for raising and lowering the gates.

3. In an apparatus of the class described, a trough, means for dividing the same into compartments, means for supplying water to the trough at one end, and a conveyer at the opposite end of the trough.

4. A trough, means dividing said trough into compartments, a water supply at one end of the trough, a screen located at the opposite end of the trough, a conveyer located above said screen, and means for raising and lowering said conveyer.

5. In an apparatus of the class described, a trough, means dividing the same into compartments, a water supply for the trough, a conveyer at the opposite end of the trough from the water supply, means for raising and lowering the compartment-forming means, and means for varying the angle of inclination of said compartment-forming means.

6. In an apparatus of the class described, a trough, a shaft extending lengthwise thereof, a plurality of gates connected to said shaft and pivoted at a point near their lower ends, and means for adjusting said gates along said shaft to change the angle of inclination of the same.

7. The combination of a trough, a plurality of gates dividing the same into compartments, and means for raising all of said gates simultaneously.

8. The combination of a trough, a conveyer at one end thereof, gates dividing said trough into compartments, means for varying the angle of inclination of the gates, and means for raising all of said gates simultaneously.

9. In an apparatus of the class described, a trough, a gate forming a partition in said trough, slides to which said gate is pivoted, and means for raising and lowering the slides to raise and lower the gates.

10. In an apparatus of the class described, a trough, a gate forming a partition in said trough, a slide to which said gate is secured, means for actuating said slide to raise and lower the same with the gate, and means for adjusting the angle of inclination of the gate.

11. In an apparatus of the class described, a trough, a curved gate forming a partition in the trough, means for raising and lowering said gate, and for varying the angle of inclination of the same.

In testimony whereof I have hereunto signed my name to this specification in the presence of two subscribing witnesses.

MAURICE C. CLARK.

Witnesses:
RICHARD B. CAVANAGH,
W. A. PAULING.